(12) United States Patent
Kristensen et al.

(10) Patent No.: US 8,191,255 B2
(45) Date of Patent: Jun. 5, 2012

(54) METHOD FOR MANUFACTURING WIND TURBINE BLADE WITH AN INTEGRATED LIGHTNING CONDUCTOR

(75) Inventors: Jens Jørgen Østergaard Kristensen, Nibe (DK); Kaj Olsen, Riiskov (DK)

(73) Assignee: Siemens Aktiengesellschaft, Munich (DE)

( * ) Notice: Subject to any disclaimer, the term of this patent is extended or adjusted under 35 U.S.C. 154(b) by 488 days.

(21) Appl. No.: 12/386,152

(22) Filed: Apr. 14, 2009

(65) Prior Publication Data

US 2009/0257881 A1  Oct. 15, 2009

(30) Foreign Application Priority Data

Apr. 15, 2008  (EP) ..................................... 08007393

(51) Int. Cl.
*B21D 53/78* (2006.01)
(52) U.S. Cl. ..................... 29/889.71; 29/889; 29/889.21
(58) Field of Classification Search ................. 29/889.6, 29/889.7, 889.71, 889, 889.21, 889.23
See application file for complete search history.

(56) References Cited

U.S. PATENT DOCUMENTS

| | | | |
|---|---|---|---|
| 2004/0017020 A1* | 1/2004 | Loving | 264/134 |
| 2007/0107220 A1* | 5/2007 | Bakhuis et al. | 29/889.7 |

FOREIGN PATENT DOCUMENTS

| | | | |
|---|---|---|---|
| DK | 200600894 A | | 6/2006 |
| EP | 1310351 B1 | | 5/2003 |
| EP | 1746284 A1 | | 1/2007 |
| EP | 1830063 A1 | | 9/2007 |
| EP | 1859920 | * | 11/2007 |
| WO | WO 96/07825 A1 | | 3/1996 |
| WO | WO 00/14405 A1 | | 3/2000 |
| WO | WO 2005/050808 A1 | | 6/2005 |
| WO | WO 2005/071788 A2 | | 8/2005 |
| WO | WO 2007/062659 A1 | | 6/2007 |
| WO | WO 2007/128314 A1 | | 11/2007 |

* cited by examiner

*Primary Examiner* — Thomas L Dickey
*Assistant Examiner* — Nikolay Yushin

(57) ABSTRACT

A method is provided for manufacturing a wind turbine rotor blade in which the blade is formed as a laminated structure by laying a composite material of fiber reinforcement material and/or core material in a mold defining the shape of the blade; evacuating the mold after laying the composite material; introducing a liquid polymer into the evacuated mold and wetting the composite material; curing the liquid polymer after the composite material has been wetted; and removing the mold after curing the liquid. At least one lightning conductor is integrated into the composite material before wetting it with the liquid polymer. Moreover, a wind turbine rotor blade made from a single laminated structure is provided with at least one lightning conductor is integrated into the laminated structure.

14 Claims, 7 Drawing Sheets

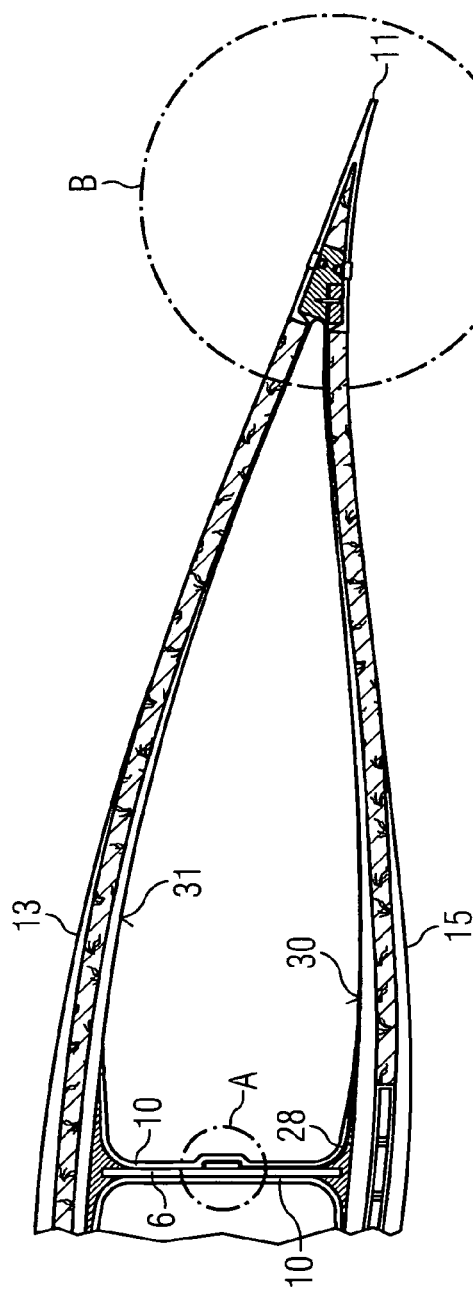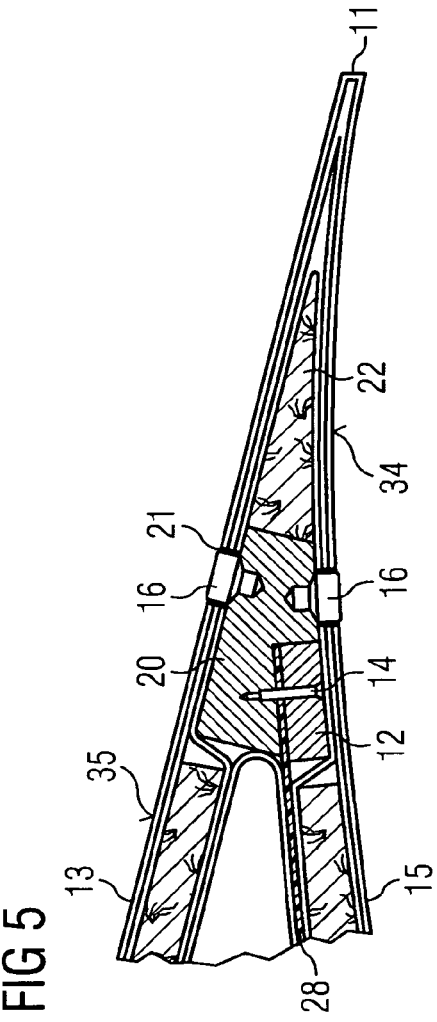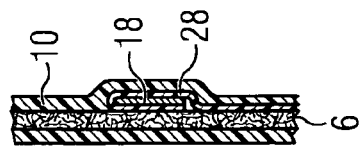

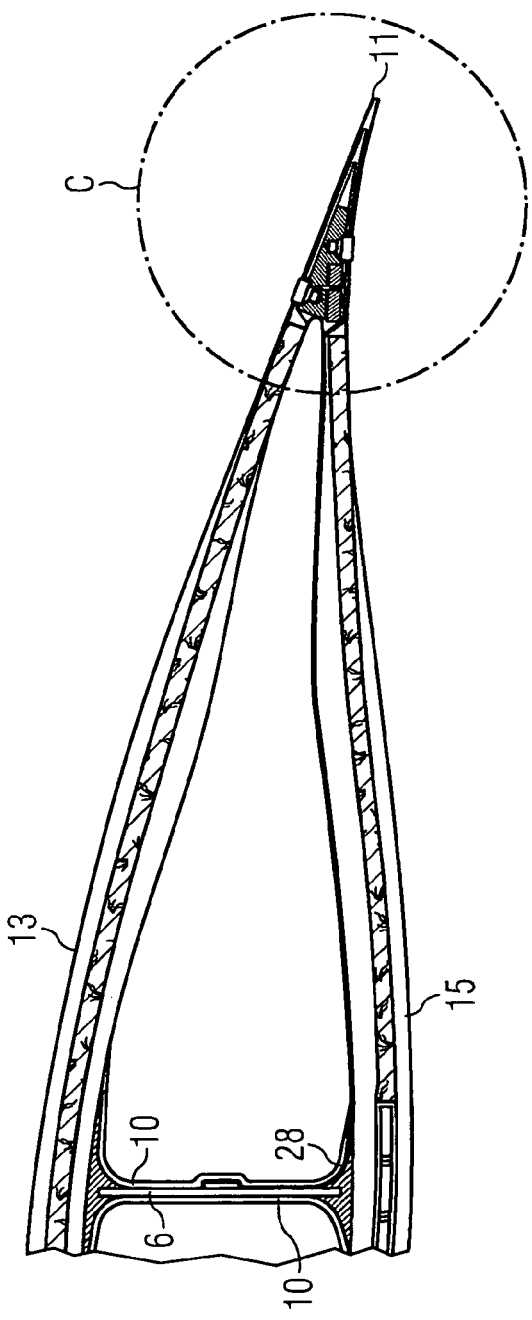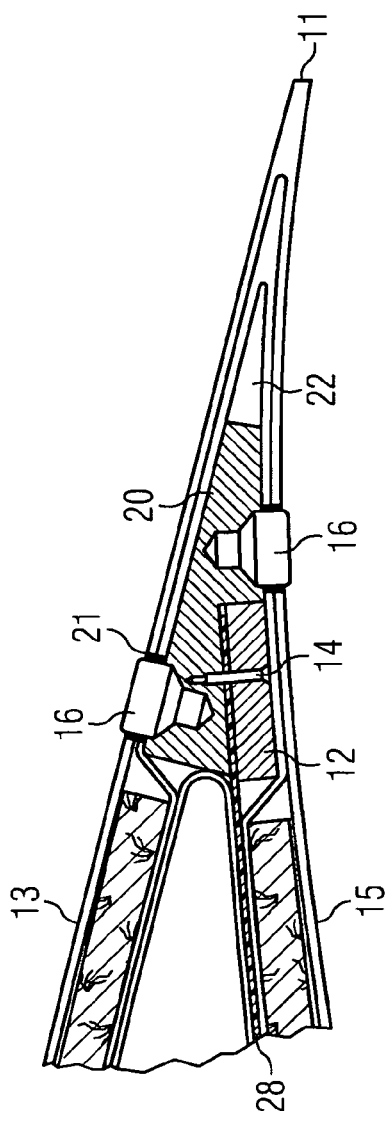

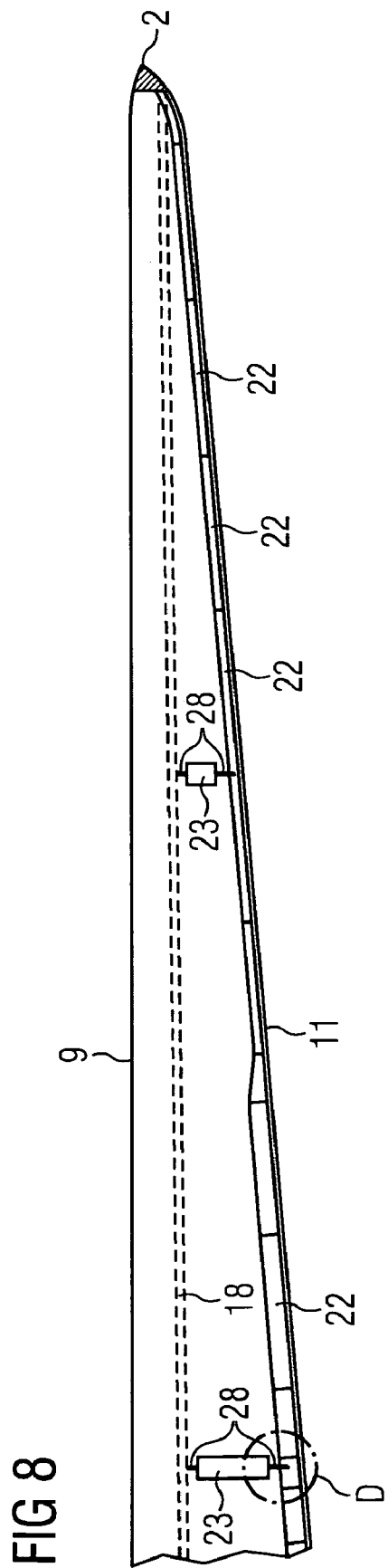

METHOD FOR MANUFACTURING WIND TURBINE BLADE WITH AN INTEGRATED LIGHTNING CONDUCTOR

CROSS REFERENCE TO RELATED APPLICATIONS

This application claims priority of European Patent Office application No. 08007393.5 EP filed Jul. 15, 2004, which is incorporated by reference herein in its entirety.

FIELD OF INVENTION

The present invention relates to a method for manufacturing a wind turbine rotor blade with an integrated lightning conductor. The invention further relates to a wind turbine blade with an integrated lightning conductor.

BACKGROUND OF INVENTION

Lightning conductor cables in wind turbine blades that are only attached to the blade structure at certain points are to a certain extent able to move when the turbine is in operation. This can cause wear to both the blade structure and the conductor cables themselves.

SUMMARY OF INVENTION

Traditionally, the lightning conductor of a wind turbine blade has taken the form of a metal wire affixed to the interior structure of the blade. For example, in WO 2007/062659 A1 a lightning protection system for a wind turbine blade is disclosed, J where the blade is a shell body made of a composite material and comprises a root area and a tip end. The lightning protection system comprises at least one lightning receptor arranged freely accessible in or on the shell unit surface on or in the immediate vicinity of the tip of the blade. The lightning protection system further comprises a lightning conductor made of electrically conductive material extending within the shell body along substantially the entire longitudinal direction of the blade. The lightning receptor and the lightning conductor are electrically connected by means of a connection area. The lightning conductor in its entire longitudinal direction as well as the connection area between the lightning conductor and the lightning receptor are electrically insulated in order to prevent lightning striking through the surface of the blade.

Moreover, in EP 1 830 036 A1 a wind turbine rotor blade with a laminated beam extending through the blade is disclosed. Furthermore, a lightning conductor in the form of strips of copper is disclosed. The strips of copper are running along the entire length of the beam and are covered by fibreglass layers and thus integrated into the laminated beam.

In DK 2006 00894 it has been proposed to form a lightning conductor of metal mesh coiled around the blade and integrated between the glass- or carbon fibre layers. The lightning conductor can especially be totally integrated in one blade shell.

In EP 1 310 351 B1 a method for manufacturing windmill blades is disclosed. This method is also called Vacuum Assisted Resin Transport Moulding and comprises steps that provide:
a mould core with a flexible external core part and an internal, firm or workable core part, and outer mould parts arranged to close around the mould core for formation of a mould cavity there between,
that composite material and possible core inserts are laid on an outer mould part and/or the mould core,
that the outer mould parts are closed around the mould core and around the composite material placed in the mould cavity,
that the composite material is set,
that the outer mould parts are removed, and
that the mould core is taken out of the shape permanent blade before or after removing the outer mould parts,
that some of the required matrix material is used in connection with the reinforce fibre when laying the composite material and where additional matrix material is added after closing the mould.

The method involves use of composite materials such as glass or carbon fibre reinforced epoxy, polyester, vinyl ester, or thermoplastic. The composite material is laid around a core material for forming the plate as a sandwich structure, where the core material is used for evacuation and flow at vacuum formation of the blade as the mould cavity is subjected to vacuum whereby air is evacuated simultaneously with composite materials and possible core inserts being pressed against the inner side of the outer mould parts due to the flexible external core part of the mould core, and where the matrix material is injected following formation of the mould cavity by vacuum.

Based on this method it is an objective of the present invention to provide an advantageous method for manufacturing a laminated wind turbine blade comprising lightning conductor. It is a further objective of the present invention to provide an advantageous laminated wind turbine blade.

The first objective is solved by a method for manufacturing a wind turbine blade. The second objective is solved by a wind turbine rotor blade. The depending claims define further developments of the invention. All features are advantageous separate and in combination with each other.

In the inventive method for manufacturing a wind turbine rotor blade the blade is formed as a laminated structure by laying a composite material of fibre reinforcement material and/or core material in a mould defining the shape of the blade; evacuating the mould after laying the composite material; introducing a liquid polymer into the evacuated mould and wetting the composite material; curing the liquid polymer after the composite material has been wetted; and removing the mould after curing the liquid polymer. The inventive method is characterised in integrating at least one lightning conductor into the composite material before wetting it with the liquid polymer. In the context of the present invention a lightning conductor is defined as an electrically conducting component of a lightning protection system, especially a metallic component.

The inventive method allows the inclusion of the larger part of the lightning protection system within the laminated blade structure during manufacturing of the blade structure. By means of the inventive method all metallic components of the lightning protection system can be covered by high-quality vacuum-impregnated laminate that forms an integral joint with the rest of the blade, yielding maximum protection against lightning strikes being attracted to any point of the conductor system other than the intended point at the receptor.

The process of Vacuum Assisted Resin Transport Moulding may be used. The lightning conductor may be integrated during laying the composite material on an outer mould part and/or the mould core. The lightning conductor can, for example, be covered by glass fibre which will be impregnated with resin during the vacuum injection process. Since the, for example metallic, components of the lightning protection system are completely surrounded by resin they do not come into contact with the air, and are therefore optimally protected against corrosion.

The lightning conductor as a component of a lightning protection system can be pressed into its final position by applying vacuum. Moreover, the component can be fixed in its final position by infusing resin and allowing the resin to set. By this means all components of the system are firmly fixed in position and are unable to grate against each other or against other parts of the blade and thereby cause damage to themselves or other parts of the blade.

Advantageously at least one flat and/or braided lightning conductor is used. The flat and/or braided conductor may be placed next to a shear web of the wind turbine blade. Using a flat conductor has two advantages: It reduces the self-inductance of the conductor and it makes it easier to extract the mould core when the resin has set. Also a flat conductor is more readily incorporated in a relatively thin laminated wall. Using a braided conductor allows the resin to penetrate into the conductor resulting in a tighter integration with the laminate. At the same time a braid is more flexible than a solid conductor.

A flat, braided conductor made of tinned copper wire may form the backbone of the lightning protection system. This main lightning conductor may be placed next to the shear web of the blade essentially along the centreline of the blade.

For example, the flat and/or braided lightning conductor can be placed along the centreline of the wind turbine blade. Placing the lightning conductor, for example the main lightning conductor, essentially along the centreline of the blade reduces mechanical stresses on the conductor.

The wind turbine blade may comprise a tip and a trailing edge. At least one metallic block can be placed close to the tip and/or along the trailing edge when laying the composite material and the lightning conductor may be connected to the metallic block. For example, an aluminium block can be used as metallic block. Moreover, the lightning conductor may be pressed against the metallic block by means of a squared washer bolted to the block. The metallic block can especially be inserted into a trailing edge core or a tip core. It can be inserted and connected to the lightning conductor before wetting the composite material with the liquid polymer.

A main lightning conductor may be connected to the metallic block located close to the tip. Furthermore, at least one additional lightning conductor comprising a first end and a second end can be connected with its first end to the main lightning conductor and with its second end to the metallic block which is placed along the trailing edge. The main lightning conductor and the additional lightning conductor may, for example, be made of braided, tinned copper. For example, the second end of the additional lightning conductor can be pressed against the main lightning conductor by means of a squared washer bolted to the shear web or the second end can be bent around the main lightning conductor.

At least one outside lightning receptor may be connected to the metallic block after the liquid polymer has cured and the mould has been removed. The outside lightning receptors can especially be bolted or screwed into the metallic, for example aluminium, blocks. The receptors may be sealed against the shell laminate structure of the blade by means of a joint sealer.

The inventive method may, for example, comprise steps that provide:
- a mould core with a flexible external core part and an internal, firm or workable core part, and outer mould parts arranged to close around the mould core for formation of a mould cavity there between,
- that composite material and possible core inserts are laid on an outer mould part and/or the mould core,
- that the outer mould parts are closed around the mould core and around the composite material placed in the mould cavity,
- that the composite material is laid around a core material for forming the whole blade as a sandwich structure, where the core material is used for evacuation and flow at vacuum formation of the blade as the mould cavity is subjected to vacuum whereby air is evacuated simultaneously with composite materials and possible core inserts being pressed against the inner side of the outer mould parts due to the flexible external core part of the mould core, and where the matrix material is injected following formation of the mould cavity by vacuum,
- that the composite material is set,
- that the outer mould part is removed,
- that the mould core is taken out of the shape permanent blade before or after removing the outer mould parts,
- that some of the required matrix material is used in connection with the reinforcing fibre when laying the composite material and where additional matrix material is added after closing the mould.

The inventive wind turbine rotor blade is made from a single laminated structure and at least one lightning conductor is integrated, in particular firmly integrated, into the laminated structure. The inventive wind turbine rotor blade may comprise a shear web as part of the laminated structure. The lightning conductor may be located next to the shear web. A firm integration in the laminated structure prevents the lightning conductor which is a component of the lightning protection system from grating against each other or against other parts of the blade and thereby causing damage to themselves or other parts of the blade.

The blade may comprise a centreline and the lightning conductor may be located along the centreline. This reduces mechanical stresses on the conductor.

The lightning conductor may be at least partly a flat and/or braided conductor. Using a flat conductor reduces the self-inductance of the conductor and is more readily incorporated in a relatively thin laminated wall. Moreover, a braid conductor is more flexible than a solid conductor.

The wind turbine blade may comprise a tip and a trailing edge. At least one metallic block, which constitutes a part of the lightning protection system, can be located close to the tip and/or along the trailing edge. Advantageously a number of metallic blocks can be located along the trailing edge. The metallic block can, for example, be an aluminium block. The lightning conductor may be connected to the metallic block. For example, the lightning conductor may be pressed against the metallic block by means of a squared washer bolted to the block. Furthermore, at least one outside lightning receptor can be connected to the metallic block. Advantageously one outside lightning receptor can be connected to each metallic block, for example by means of a screw.

Moreover, at least one additional lightning conductor may be present besides a main lightning conductor. The main conductor may be connected to the metallic block located close to the tip and the at least one additional conductor may comprise a first end and a second end. The first end may be connected to the main lightning conductor and the second end may be connected to the metallic block which is located along the trailing edge. The second end of the additional lightning conductor can be pressed against the main lightning conductor by means of a squared washer bolted to the shear web, or the second end may be bent around the main lightning conductor.

Generally the lightning conductor can be covered by fibreglass, which may additionally be impregnated with resin.

BRIEF DESCRIPTION OF THE DRAWINGS

Further features, properties, and advantages of the present invention will become clear from the following description of an embodiment in conjunction with the accompanying drawings.

FIG. 3 schematically shows part of a chord-wise section of an inventive wind turbine blade at a position which is indicated by III-III in FIG. 1.

FIG. 4 schematically shows a section of the shear web of the inventive wind turbine blade.

FIG. 5 schematically shows the section, which is indicated by B in FIG. 3, in an enlarged view.

FIG. 6 schematically shows part of a chord-wise section of an inventive wind turbine blade at a position which is indicated by VI-VI in FIG. 1.

FIG. 7 schematically shows the section, which is indicated by C in FIG. 6, in an enlarged view.

FIG. 8 schematically shows part of an inventive wind turbine blade in a plan view on the plane defined by the blade's span and the blade's chord.

DETAILED DESCRIPTION OF INVENTION

An embodiment of the present invention will now be described in detail with reference to FIGS. 1 to 14.

Figure 1:
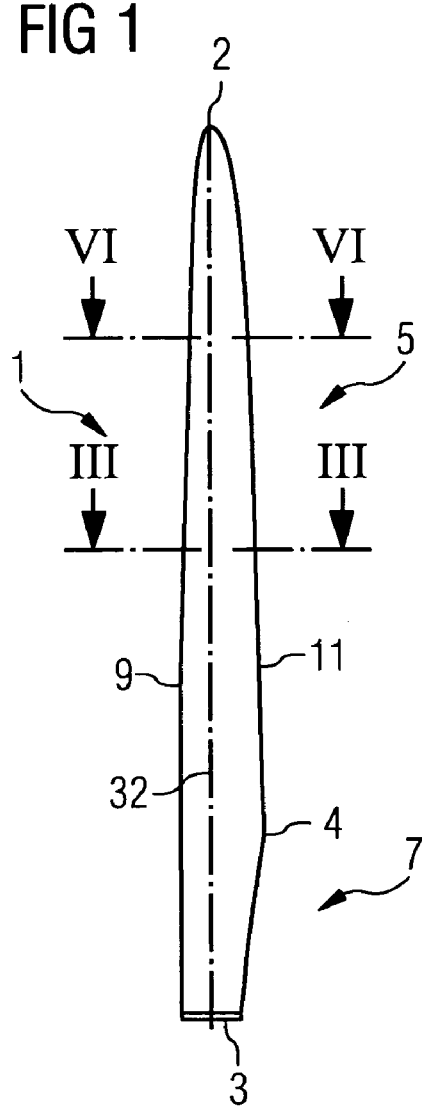
FIG. 1 schematically shows a rotor blade in a plan view on the plane defined by the blade's span and the blade's chord.

FIG. 1 shows a rotor blade in a plan view on the plane defined by the blade's span and the blade's chord. FIG. 1 shows a wind turbine blade 1 as it is usually used in a three-blade rotor. However, the present invention shall not be limited to blades for three-blade rotors. In fact, it may as well be implemented in rotors with more or less than three blades, e.g. two-blade rotors. The centreline of the blade 1 is indicated by reference numeral 32.

The rotor blade 1 shown in FIG. 1 comprises a root portion 3 with a cylindrical profile and a tip 2. The tip forms the outermost part of the blade. The cylindrical profile of the root portion 3 serves to fix the blade to a bearing of a rotor hub. The rotor blade 1 further comprises a so-called shoulder 4 which is defined as the location of its maximum profile depth, i.e. the maximum chord length of the blade. Between the shoulder 4 and the tip 2 an airfoil portion 5 extends which has an aerodynamically shaped profile. Between the shoulder 4 and the cylindrical root portion 3, a transition portion 7 extends in which a transition takes place from the aerodynamic profile of the airfoil portion 5 to the cylindrical profile of the root portion 3.

Figure 2:
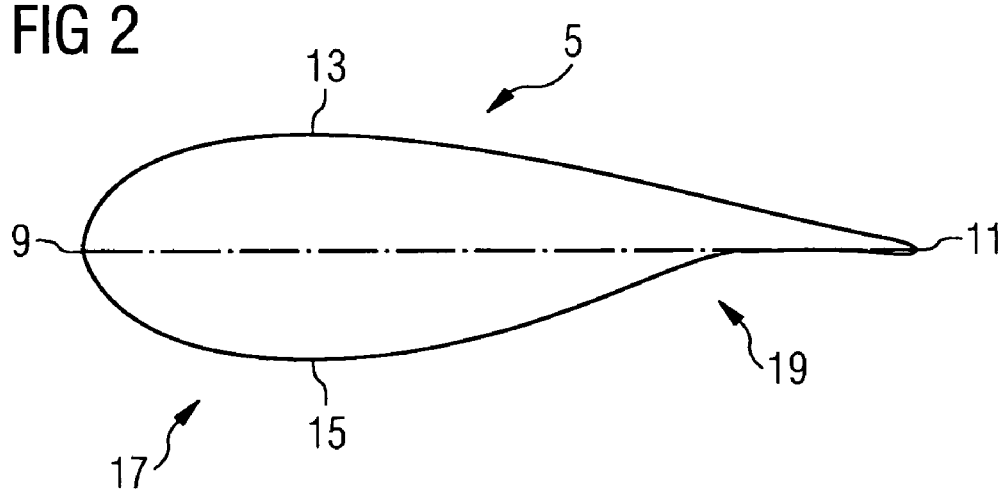
FIG. 2 schematically shows a chord-wise cross section through the rotor blade's airfoil section.

A chord-wise cross section through the rotor blade's airfoil section 5 is shown in FIG. 2. Their aerodynamic profile shown in FIG. 2 comprises a convex suction side 13 and a less convex pressure side 15. The dash-dotted line extending from the blade's leading edge 9 to its trailing edge 11 shows the chord of the profile. Although the pressure side 15 comprises a convex section 17 and a concave section 19 in FIG. 2, it may also be implemented without a concave section at all as long as the suction side 13 is more convex than the pressure side 15.

The suction side 13 and the pressure side 15 in the airfoil portion 5 will also be referred to as the suction side and the pressure side of the rotor blade 1, respectively, although, strictly spoken, the cylindrical portion 3 of the blade 1 does not show a pressure or a suction side.

FIG. 3 schematically shows part of a chord-wise section of the inventive wind turbine blade 1 at a position which is indicated by III-III in FIG. 1. For example, the shown position can be located at a distance of 27 m, measured from the blade root 3. This distance corresponds to approximately 50% of the total length of the blade 1. In FIG. 3 the trailing edge 11, the suction side 13 and the pressure side 15 are shown. The suction side 13 and the pressure side 15 are connected by means of a shear web 6 which is located inside the blade 1. The rotor blade's shell and the shear web are formed as a single integrated laminated structure.

A lightning conductor in form of a lightning cable 28 is connected to the shear web 6 and continues along the inner surface 30 of the pressure side 15 to the trailing edge 11. Alternatively, the lightning cable 28 can continue from the shear web 6 along the inner surface 31 of the suction side 13 to the trailing edge 11. The lightning cable 28 is covered by a laminated structure 10, which may be for example glass fibre or carbon fibre. The glass fibre or the carbon fibre may further be impregnated with resin.

FIG. 4 schematically shows an enlarged view of the section which is indicated by A in FIG. 3. In FIG. 4 part of the shear web 6, a main conductor 18, an additional conductor 28, and the laminated structure 10 are visible. The main conductor 18, which is a flat, braided conductor, runs along the shear web 6 from the tip 2 to the blade root 3 of the wind turbine blade 1. The additional conductor 28, which is also a flat, braided conductor, is bent around the main conductor 18 and is connected to the shear web 6. The main conductor 18 and the additional conductor 28 may be made of tinned copper wire. The main conductor 18 may be placed next to the shear web of the blade 1 essentially along the centreline 32 of the blade 1. The main conductor 18 as well as the additional conductor 28 is fixed in their final position by the laminated structure 10. Since the metallic components of the lightning protection system, for example the main conductor 18 and the additional conductor 28, are completely surrounded by the laminated structure 10 and/or by resin, they do not come into contact with the air and therefore they are optimally protected against corrosion.

FIG. 5 schematically shows an enlarged view of the section which is indicated by B in FIG. 3. In FIG. 5 the portion around the trailing edge 11 is visible. Inside the blade 1 next to the trailing edge 11 a trailing edge core 22 followed towards the leading edge 9 by an aluminium block 20 is located. The edge core 22 and the aluminium block 20 are integrated into the laminated structure of the blade (1). At the suction side 13 and at the pressure side 15 receptors 16 are bolted to the aluminium block 20. Near the outer surface 34 of the pressure side 15 and near the outer surface 35 of the suction side 13 the receptors 16 are sealed against the blade's material by means of a joint sealer 21.

The additional conductor 28 is pressed against the aluminium block 20 by means of a squared washer 12 and a screw 14. Generally, the aluminium block 20 can alternatively be any other metallic block.

In FIG. 5 the receptors 16 of the suction side 13 and the pressure side 15 are located opposite to each other and are located between the squared washer 12 and the trailing edge 11.

FIG. 6 schematically shows part of a chord-wise section of the inventive wind turbine blade 1 at a position which is indicated by VI-VI in FIG. 1. This position may, for example, be located at a distance of 36 m, measured from the blade root 3. This distance corresponds to approximately 75% of the total length of the blade 1. FIG. 7 schematically shows an enlarged view of the section which is indicated by C in FIG. 6. The elements which are shown in FIGS. 6 and 7 correspond to the elements which are shown in FIGS. 3 and 5 and are not described in detail again. The FIGS. 3 and 6, as well as the FIGS. 5 and 7, mainly differ from each other regarding the sizes of the components. Moreover, unlike in FIG. 5 the receptor 16, which is located at the suction side 13 of the blade 1, is located opposite to the squared washer 12 in FIGS. 6 and 7. This difference is caused by the decreased size of the aluminium block 20.

FIG. 8 schematically shows part of the inventive wind turbine blade 1 in a plan view on the plane defined by the blade's span and the blade's chord. Inside the blade 1 essentially along the centreline 32 of the blade 1 the main conductor 18 is located. Along the trailing edge 11 trailing edge cores 22 are mounted inside the blade 1. At two exemplary positions, which may correspond to the positions which are shown in the FIGS. 3 and 6, the additional conductor 28 is connected to the trailing edge core 22 via an aluminium block 20. To achieve this, the additional conductor 28 is connected to the main conductor 18, as described with reference to FIG. 4. The additional conductor 28 is further connected to an aluminium block 20, which is not shown in FIG. 8 but which is connected to the trailing edge core 22. The additional conductor 28 is surrounded by a laminated structure 23.

Additionally to the two exemplary positions, which may correspond to the positions which are shown in the FIGS. 3 and 6, i.e. 50% and 75% of the total length of the blade 1 measured from the blade root 3, also at a third position which corresponds to approximately 87.5% of the total length of the blade 1 measured from the blade root 3 an additional conductor 28 can be connected to the trailing edge core 22 via an aluminium block 20.

Figure 9:
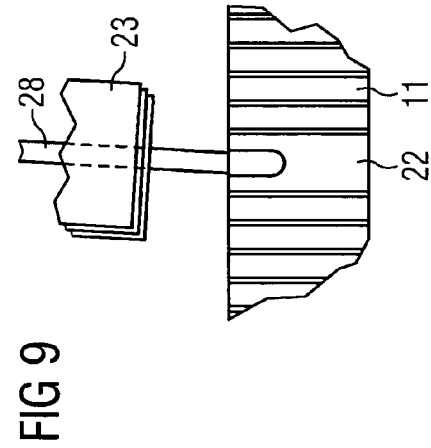
FIG. 9 schematically shows an enlarged view of the section which is indicated by D in FIG. 8.

FIG. 9 schematically shows an enlarged view of the section which is indicated by D in FIG. 8. The additional conductor 28 which is at least partially surrounded by a laminated structure 23 and which is connected to an aluminium block 20 is shown. The aluminium block 20 is connected to the trailing edge core 22.

Figure 10:
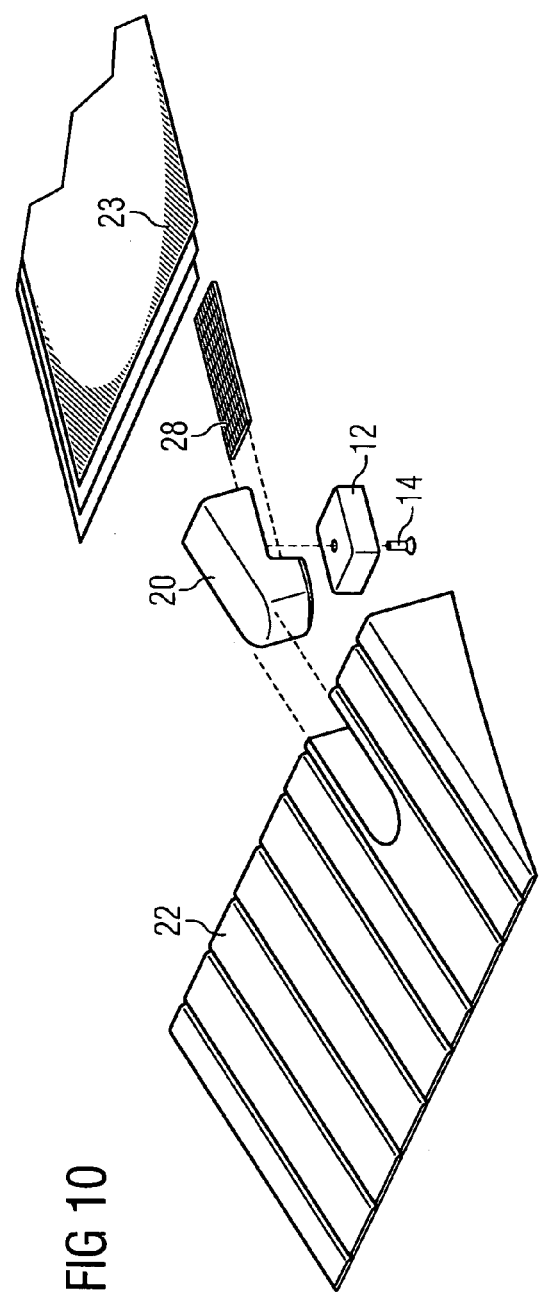
FIG. 10 schematically shows a perspective, exploded view of the section which is indicated by D in FIG. 8.

FIG. 10 shows the section of FIG. 9 in a perspective, exploded view. Again, the additional conductor, which is a flat, braided copper conductor, is covered by a laminated structure 23. The additional conductor 28 is pressed against the aluminium block 20 by means of a squared washer 12 and a screw 14. Moreover, the aluminium block 20 is inserted into the trailing edge core 22.

Figure 11:
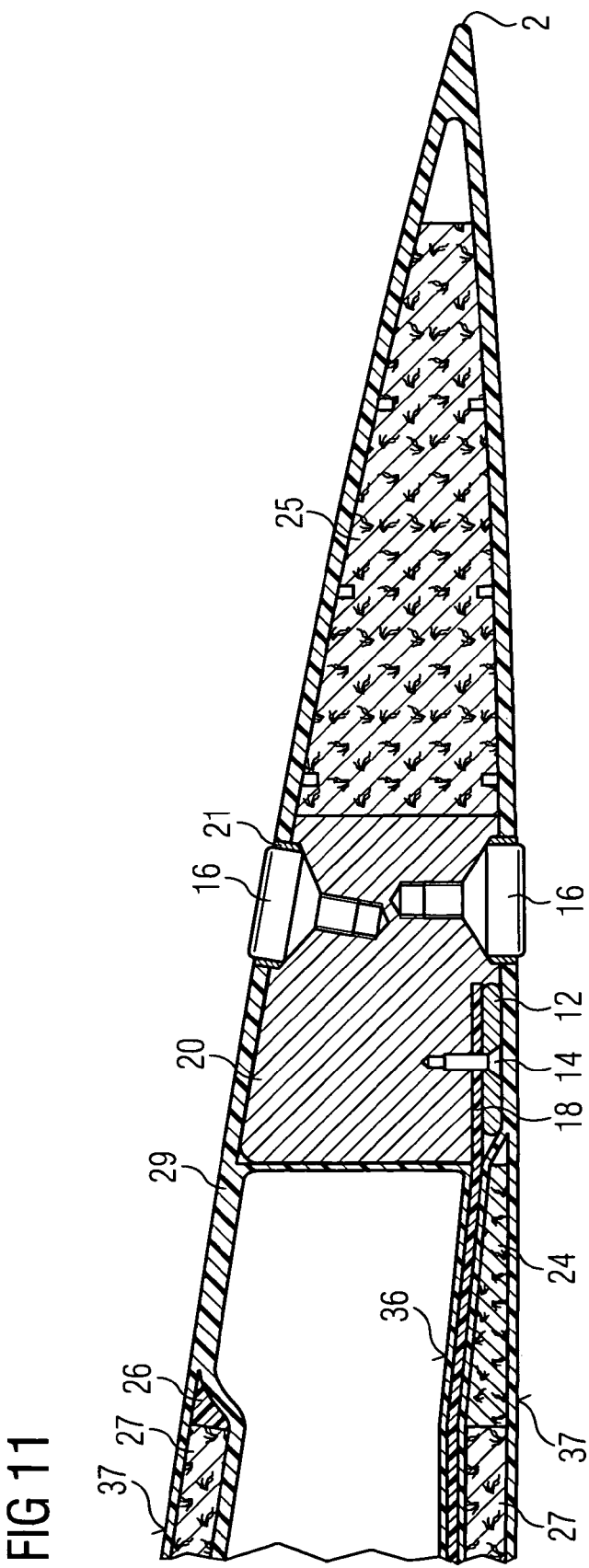
FIG. 11 schematically shows the tip of an inventive wind turbine blade in a sectional view.

FIG. 11 schematically shows the portion around the tip 2 of the wind turbine blade 1 in a sectional view. Inside the tip 2 a tip core 25 followed towards the blade root 3 by an aluminium block 20 is located. The basic material of the wind turbine blade 1 has a shell laminate structure 29. The main conductor 18 of the lightning protection system is pressed against the aluminium block 20 by means of a squared washer 12 and a screw 14. The main conductor 18 runs along the inner surface 36 towards the blade root 3. The main conductor 18 is covered by glass fibre and is integrated into the laminated structure 29. Next to the aluminium block 20 towards the blade root 3 a wooden ramp 24 is also integrated into the laminated structure 29. The wooden ramp 24 is located between the main conductor 18 and the outer surface 37 of the blade 1. Next to the wooden ramp 24 towards the blade root 3 a distance material 27 is integrated into the shell laminate structure 29. For example, the distance material 27 may be made of wood, for instance Balsa wood, C flex, Noryl foam or any other suitable material. The distance material 27 is also located between the main conductor 18 and the outer surface 37 of the blade 1.

Opposite to the edge wherein the main conductor 18 is integrated also the distance material 27 is integrated into the shell laminate structure 29 of the blade 1. Between the portion wherein the distance material 27 is integrated and the portion where the aluminium block 20 is located a small portion is situated, wherein epoxy 26 is integrated into the shell laminate structure 29. The epoxy 26 is located next to the distance material 27.

Moreover two receptors 16 are bolted to the aluminium block 20 from the outer surface 37. The receptors 16 are sealed against the shell laminate structure 29 by means of a joint sealer 21.

During lay-up, which is advantageously performed by Vacuum Assisted Resin Transport Moulding, at least most of the components of the lightning protection system are included in the pre-form during lay-up. When vacuum is applied these components are pressed into their final positions, and they are subsequently fixed in these positions when the resin is infused and allowed to set. During lay-up, the main conductor 18, which runs along the entire length of the blade 1, is placed next to the shear web 6 and is covered by glass fibre. Close to the tip 2 of the blade 1 an aluminium block 20 is placed. This block 20 forms a mounting base for the external lightning receptors 16. The main conductor 18 is pressed against this block 20 by means of a squared washer 12 bolted to the aluminium block 20. All of these elements are subsequently covered by glass and this glass is impregnated with resin during the vacuum injection process.

Along the trailing edge 11 of the blade 1 a number of additional aluminium blocks 20 are placed as mounting bases for the external lightning receptors 16. Additional conductors 28 of braided, tinned copper connect the main conductor 18 to these aluminium blocks 20. One end of each copper braid 28 is pressed against an aluminium block 20 by means of a squared washer 12 bolted to the aluminium block 20. The other end can be affixed in two ways. It is either pressed against the main conductor 18 by means of a squared washer bolted to the shear web 6, or it is bent around the main conductor 18 and covered by glass fibre. When vacuum is applied, the fibre, the copper braid conductor 28, and the main conductor 18 are pressed together and in this way good electrical contact is established between the copper strip 28 and the main conductor 18. The main conductor 18, the copper additional braid conductor 28, and the aluminium blocks 20 with squared washers 12 and bolts 14 are all included in the pre-form and thus become fixed within the laminated structure 10, 29 of the blade 1. Since the metallic components of the lightning protection system are completely surrounded by the laminated structure and/or resin they do not come into contact with the air and are therefore optimally protected against corrosion. Moreover, all components of the system are firmly fixed in position and are unable to grate against each other or against other parts of the blade 1. This prevents a possible damage of these components or other parts of the blade 1.

Now the inventive method for manufacturing a wind turbine rotor blade 1 in which the blade 1 is formed as a laminated structure will now be described with reference to FIGS. 12 to 14.

Figure 12:
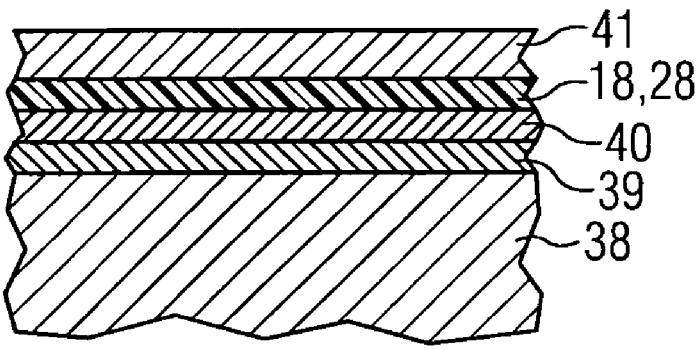
FIG. 12 schematically shows in a sectional view part of layers of a composite material of fibre reinforcement material and/or core material with a lightning conductor in a mould.
Figure 13:
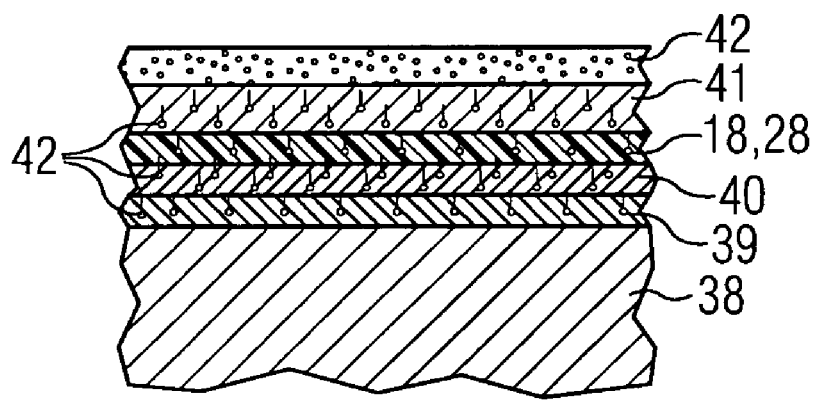
FIG. 13 schematically shows part of the layers in the mould wetted with a liquid polymer in a sectional view.

FIG. 12 schematically shows in a sectional view part of layers of a composite material of fibre reinforcement material and/or core material with a lightning conductor in a mould. Layers 39, 40 of composite material of fibre reinforcement material and/or core material are laid in a mould 38 defining the shape of the blade 1. A lightning conductor 18, 28 is laid onto the layer 40 and is covered with at least one layer 41 of composite material. Instead of the two shown layers 39, 40 also more or less layers can be used.

After laying the composite material the mould 38 is evacuated. A liquid polymer 42 is introduced into the evacuated mould 38 and the composite material is wetted with the liquid polymer 42. This is schematically show in FIG. 13. The liquid polymer permeates into the layers 39, 40, 41. After the composite material has been wetted, the liquid polymer 42 cures and the mould 38 is removed after curing the liquid polymer 42.

Figure 14:
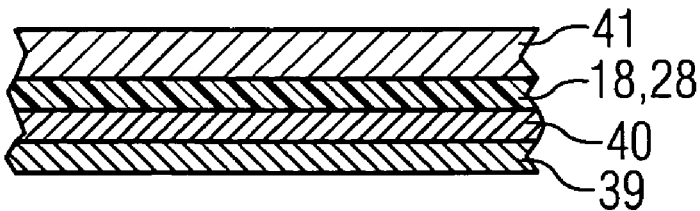
FIG. 14 schematically shows part of the layers after removing the mould after curing the liquid polymer in a sectional view.

FIG. 14 schematically shows the layers 39, 40, 41 after removing the mould 38 after curing the liquid polymer 42 in a sectional view. The lightning conductor 18, 28 is firmly integrated in the resulting laminated structure.

The invention claimed is:

1. A method for manufacturing a wind turbine rotor blade in which the blade is formed as a laminated structure, comprising:
   laying a composite material of fibre reinforcement material and/or core material in a mould defining the shape of the blade;
   integrating a first lightning conductor into the composite material;
   evacuating the mould after laying the composite material;
   introducing a liquid polymer into the evacuated mould and wetting the composite material;
   curing the liquid polymer after the composite material has been wetted; and
   removing the mould after curing the liquid polymer,
   wherein a first lightning conductor is integrated into the composite material before wetting the composite material, and
   wherein the first lightning conductor is braided.

2. The method as claimed in claim 1, wherein the first lightning conductor is covered by glass fibre.

3. The method as claimed in claim 1, wherein the braided first lightning conductor is placed along a centre line of the wind turbine blade.

4. The method as claimed in claim 1, wherein the first lightning conductor is integrated during laying the composite material on an outer mould part and/or a mould core.

5. The method as claimed in claim 1, wherein an outside lightning receptor is connected to the metallic block after the liquid polymer has cured and the mould has been removed.

6. The method as claimed in claim 1, wherein the braided conductor is placed next to a shear web of the wind turbine blade.

7. The method as claimed in claim 1,
   wherein the wind turbine blade comprises a tip and a trailing edge,
   wherein a metallic block is placed close to the tip and/or along the trailing edge when laying the composite material, and
   wherein the first lightning conductor is connected to the metallic block.

8. The method as claimed in claim 7,
   wherein the metallic block is located close to the tip,
   wherein the wind turbine blade further comprises a second lightning conductor having a first end and a second end, and
   wherein the first end is connected to the first lightning conductor the second end is connected to a further metallic block which is placed along the trailing edge.

9. The method as claimed in claim 7,
   wherein a first portion of the metallic block is located close to the tip and a second portion is located near the trailing edge,
   wherein the first lightning conductor is connected to the first portion of the metallic block,
   wherein the wind turbine blade further comprises a second lightning conductor having a first end and a second end, and
   wherein the first end is connected to the first lightning conductor the second end is connected to the second portion of the metallic block.

10. A method for manufacturing a wind turbine rotor blade in which the blade is formed as a laminated structure, comprising:
    laying a composite material of fibre reinforcement material and/or core material in a mould defining the shape of the blade;
    integrating a first lightning conductor into the composite material;
    evacuating the mould after laying the composite material;
    introducing a liquid polymer into the evacuated mould and wetting the composite material;
    curing the liquid polymer after the composite material has been wetted; and
    removing the mould after curing the liquid polymer,
    wherein a first lightning conductor is integrated into the composite material before wetting the composite material, and
    wherein the first lightning conductor is integrated during laying the composite material on an outer mould part and/or a mould core.

11. The method as claimed in claim 10, wherein the first lightning conductor is flat and/or braided.

12. The method as claimed in claim 11, wherein the flat and/or braided conductor is placed next to a shear web of the wind turbine blade.

13. The method as claimed in claim 11, wherein the flat and/or braided first lightning conductor is placed along a centre line of the wind turbine blade.

14. A method for manufacturing a wind turbine rotor blade in which the blade is formed as a laminated structure, comprising:
    laying a composite material of fibre reinforcement material and/or core material in a mould defining the shape of the blade;
    integrating a first lightning conductor into the composite material;
    evacuating the mould after laying the composite material;
    introducing a liquid polymer into the evacuated mould and wetting the composite material;
    curing the liquid polymer after the composite material has been wetted; and
    removing the mould after the liquid polymer,
    wherein a first lightning conductor is integrated into the composite material before wetting the composite material, and
    wherein an outside lightning receptor is connected to the metallic block after the liquid polymer has cured and the mould has been removed.

* * * * *